US00RE38345E

(19) United States
(12) Reissued Patent
Falciglia et al.

(10) Patent Number: US RE38,345 E
(45) **Date of Reissued Patent: *Dec. 16, 2003**

(54) ARMORED CABLE

(75) Inventors: James W. Falciglia, West Warwick, RI (US); Anthony J. Mauro, Assonet, MA (US)

(73) Assignee: WPFY, Inc., Wilmington, DE (US)

( * ) Notice: This patent is subject to a terminal disclaimer.

(21) Appl. No.: 09/482,340

(22) Filed: Jan. 13, 2000

Related U.S. Patent Documents

Reissue of:
(64) Patent No.: 5,708,235
Issued: Jan. 13, 1998
Appl. No.: 08/712,323
Filed: Sep. 11, 1996

U.S. Applications:

(60) Continuation of application No. 08/458,642, filed on Jun. 2, 1995, now Pat. No. 5,557,071, which is a continuation of application No. 08/139,314, filed on Oct. 19, 1993, now Pat. No. 5,468,914, which is a division of application No. 07/865,334, filed on Apr. 8, 1992, now Pat. No. 5,350,885.

(51) Int. Cl.[7] ..... H01B 7/36
(52) U.S. Cl. ..... 174/112; 156/50; 156/51
(58) Field of Search ..... 174/102 D, 109, 174/112, 102 R, 106 R; 156/50, 51, 52

(56) References Cited

U.S. PATENT DOCUMENTS

| | | | | |
|---|---|---|---|---|
| 769,366 A | * | 9/1904 | Waterman | 138/135 |
| 817,057 A | * | 4/1906 | Greenfield | 138/122 |

(List continued on next page.)

FOREIGN PATENT DOCUMENTS

| | | | | |
|---|---|---|---|---|
| CH | 449 732 | | 4/1968 | |
| DE | 328905 | | 6/1919 | |
| DE | 751 575 | | 10/1951 | |
| FR | 763.504 | | 5/1934 | 12/6 |
| GB | 332303 | * | 7/1930 | 174/112 |
| GB | 913.514 | | 12/1962 | |
| GB | 1117862 | | 6/1968 | |
| JP | 134808 | * | 5/1989 | 174/112 |
| NL | 65-10231 | | 2/1966 | |

OTHER PUBLICATIONS

Exhibit A—order entry forms, 1990, 3 pages.
Exhibit B—order entry forms, 1990, 2 pages.
Exhibit C —memorandum, 1991, 1 page.
Aflex Prior Art Summary, prepared by Bromberg & Sunstein LLP No date.
Chart: U.S. Patent No. 5,708,235 and Prior Art, prepared by Bromberg & Sunstein LLP No date.
Answer, Affirmative Defenses and Counterclaim. No date.
First Amended Answer, Affirmative Defenses and Counterclaim. No date.
Joint Statement Pursuant to Local Rule 16.1 No. date.

*Primary Examiner*—Chau N. Nguyen
(74) *Attorney, Agent, or Firm*—Fish & Richardson P.C.

(57) ABSTRACT

Armored cable sheath is coded for easy visual identification by applying patterns, e.g., colored patterns, along the length of the cable. The sheath may be formed of a helically interlocked continuous strip of metal, or of smooth or corrugated continuous metal tubing. The patterns are applied on the outer surface of the sheath and are repeated along the length of the sheath.

51 Claims, 12 Drawing Sheets

U.S. PATENT DOCUMENTS 840,766 A * 1/1907 Greenfiled ..... 138/135
951,147 A * 3/1910 Porter ..... 174/112
1,068,553 A * 7/1913 Abell et al. ..... 138/135
1,383,187 A * 6/1921 Brinkman et al. ..... 72/49
1,580,760 A * 4/1926 Palmer ..... 29/429
1,596,215 A * 8/1926 Palmer ..... 72/368
1,617,383 A * 2/1927 Fentress ..... 40/406
1,781,574 A * 11/1930 Frederickson ..... 138/131
1,913,390 A * 6/1933 Hungerford ..... 138/135
1,995,407 A * 3/1935 Walker ..... 174/74 R
2,086,152 A * 7/1937 Bedell ..... 138/134
2,106,048 A * 1/1938 Candy, Jr. ..... 174/112
2,118,630 A * 5/1938 Waldron ..... 174/103
2,234,675 A * 3/1941 Johnson ..... 174/27
2,372,868 A * 4/1945 Warren, Jr. ..... 57/238
2,379,318 A * 6/1945 Safford ..... 174/107
2,628,998 A 2/1953 Frisbie
2,944,337 A * 7/1960 Coleman ..... 29/417
3,020,335 A 2/1962 Gillis
3,073,944 A * 1/1963 Yuter ..... 219/62
3,197,554 A * 7/1965 Baker ..... 174/112
3,311,133 A * 3/1967 Kinander ..... 138/136
3,328,514 A * 6/1967 Cogelia ..... 174/113 R
3,459,233 A * 8/1969 Webbe ..... 138/131
3,459,878 A * 8/1969 Gressitt et al. ..... 174/112
3,474,559 A * 10/1969 Hunt ..... 40/316
3,551,542 A * 12/1970 Perrone ..... 264/166
3,636,234 A * 1/1972 Wakefield ..... 174/109 X
3,650,862 A * 3/1972 Burr ..... 156/51
3,682,203 A * 8/1972 Foti et al. ..... 138/135
3,720,747 A * 3/1973 Anderson et al. ..... 264/246
3,815,639 A * 6/1974 Westerbarkey ..... 138/135
3,865,146 A * 2/1975 Meserole ..... 138/154
3,913,623 A * 10/1975 Siegwart ..... 138/122
3,938,558 A * 2/1976 Anderson ..... 138/122
3,994,090 A * 11/1976 Wheeler ..... 40/316
4,021,315 A 5/1977 Yanagida et al. ..... 204/35
4,029,129 A * 6/1977 Harper ..... 138/135
4,128,736 A * 12/1978 Nutt et al. ..... 174/112
4,141,385 A * 2/1979 Siegwart ..... 138/122
4,154,976 A * 5/1979 Brorein ..... 174/102 R X
4,158,746 A * 6/1979 Taylor et al. ..... 174/112
4,197,723 A * 4/1980 Ehedy et al. ..... 66/85 A
4,274,086 A * 6/1981 Benckendorff et al. ..... 340/506
4,278,836 A * 7/1981 Bingham ..... 174/84 S
4,310,946 A * 1/1982 Baker et al. ..... 15/363
4,326,561 A * 4/1982 Kutnyak ..... 138/136
4,423,306 A * 12/1983 Fox ..... 219/137.9
4,424,627 A 1/1984 Tarbox
4,499,010 A 2/1985 Tanino et al. ..... 252/512
4,528,420 A * 7/1985 Kish et al. ..... 174/112
4,543,448 A 9/1985 Deurloo
4,579,759 A * 4/1986 Breuers ..... 428/375
4,629,285 A * 12/1986 Carter et al. ..... 385/128
4,749,823 A * 6/1988 Ziemek et al. ..... 174/106 R X
4,880,484 A * 11/1989 Obermeier et al. ..... 156/51
4,947,568 A * 8/1990 De Barbieri ..... 40/316
5,001,303 A * 3/1991 Coleman et al. ..... 174/102 R
5,038,001 A * 8/1991 Koegel et al. ..... 174/112
5,189,719 A 2/1993 Coleman et al.
5,289,767 A 3/1994 Montalto et al. ..... 101/35
5,470,253 A 11/1995 Siems et al. ..... 439/491
5,504,540 A 4/1996 Shatas

* cited by examiner

ARMORED CABLE

Matter enclosed in heavy brackets [ ] appears in the original patent but forms no part of this reissue specification; matter printed in italics indicates the additions made by reissue.

*More than one reissue application has been filed for the reissue of U.S. Pat. No. 5,708,235. The reissue applications are U.S. Ser. No. 09/482,340 and U.S. Ser. No. 10/058,225, which is a continuation of U.S. Ser. No. 09/482,340. U.S. Pat. No.* 5,708,235 [This] is a continuation of application Ser. No. 08/458,642 filed on Jun. 2, 1995, allowed, now as U.S. Pat. No. [5,5557,071] *5,557,071*, which is a continuation of Ser. No. 08/139,314, filed on Oct. 19, 1993, now issued as U.S. Pat. No. 5,468,914, which is a divisional of Ser. No. 07/865,334, filed Apr. 8, 1992, now issued as U.S. Pat. No. 5,350,885.

BACKGROUND OF THE INVENTION

This invention relates to armored cable.

Armored cable typically has a metal sheath enclosing one or more individually insulated conductors. The sheath may be formed of a helically interlocked continuous strip of metal, or of smooth or corrugated continuous metal tubing.

The National Electrical Code identifies two types of armored cable: "Type MC" and "Type AC". In Type AC, the insulated conductors are individually wrapped with protective paper, and a bare ground wire extends the length of and touches the inside wall of the sheath.

In Type MC cable, the insulated conductors are not individually wrapped with paper; rather they are surrounded as a group with a paper or plastic insulating wrap. The ground wire is one of the individually insulated conductors and, thus, does not touch the inside wall of the sheath. While the internal configurations of Type MC and Type AC armored cables differ, they have similar external appearances (i.e., gray-colored metal).

Armored cable permits orderly wiring for various applications within a building (e.g., fire protection devices, lighting, motors). For example, wires of different sizes serving different applications may be grouped within different armored cables. Because the cables typically are installed near to each other, and because the cables look identical or similar, it is difficult to distinguish the different cables which serve different applications. The particular application associated with an armored cable may or may not be indicated by attaching an identification tag, stamping a code into the outer surface of the cable's sheath, or writing (e.g., with an indelible marker) in relatively small print somewhere on the outer surface of the sheath.

SUMMARY OF THE INVENTION

In general, in one aspect, the invention features an armored cable sheath including a conductive tubular structure having an internal passage, an outer surface, a first end, and a second end. The internal passage is sized and configured to enclose one or more conductors. The tubular structure is made of a material having a first visual appearance. A pattern of visible indicia, of different visual appearance from the first visual appearance, is applied on the outer surface and is repeated along the length of the sheath.

Embodiments of the invention include the following features. The pattern has color, e.g., red, green, blue, or yellow and is repeated at regular intervals along the length of the sheath.

In some embodiments, the conductive tubular structure includes crowns and valleys of a helically wound strip and the pattern leaves exposed a substantial portion of the outer surface of the crowns, and also leaves exposed a substantial portion of the strip where edges of the strip along the crowns contact a surface of the strip at the valleys. The pattern, applied along the length of the strip, may be discontinuous, e.g., a sequence of spots. The pattern may be a non-conductive material, and may be of ink, dye, or paint.

In some embodiments, the tubular structure comprises a cylinder formed from a continuous piece of metal tubing, and the pattern is formed repeatedly along the length of the sheath. The cylinder may have one or more corrugated outer walls and may have a generally rectangular transverse cross-sectional configuration.

In general, in other aspects, the invention features a cable including one or more conductors enclosed within the sheath, and a set of armored cables having applied patterns of different visual appearance.

In general, in other aspects, the invention features methods of making an armored cable sheath which include applying visual indicia to the outer surface of a conductive tubular structure or to the strip from which it is made by helical winding.

By looking at the cable, one can easily determine the number of conductors, type of insulation, and/or type of cable, or the particular application. The premarking of various colored designs on the sheath saves time and reduces errors in handling, installing, inspecting, and maintaining the armored cable.

Other features and advantages of the invention will become apparent from the following description and from the claims.

DESCRIPTION

The drawings are first briefly described.

Figure 11:
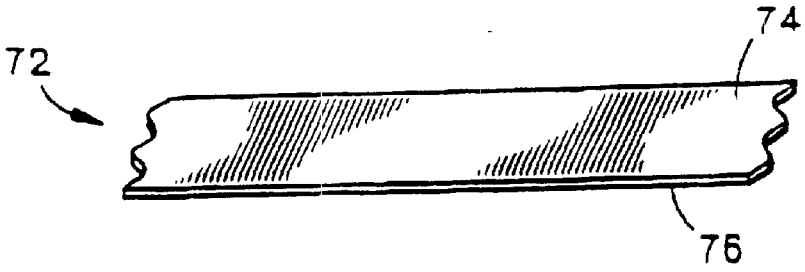
FIG. 11 is a fragmentary perspective view of a metal strip used to form an armored cable sheath.
Figure 13:
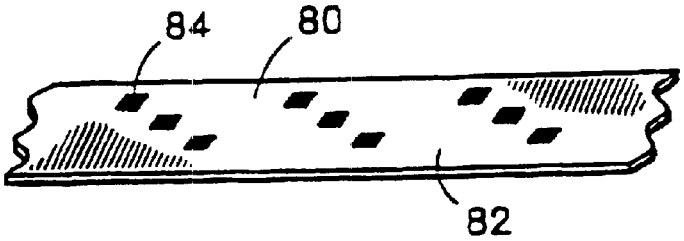
Figure 14:
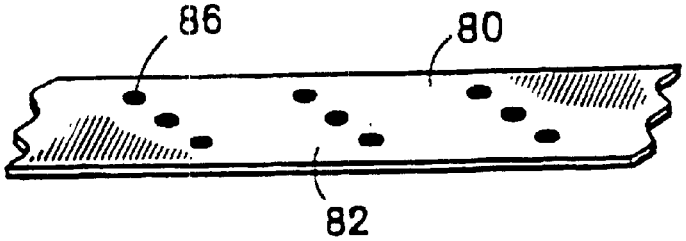
Figure 15:
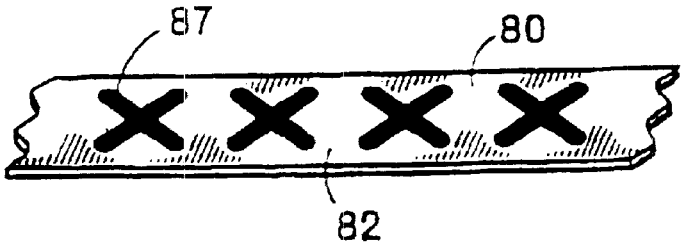

FIGS. 13, 14, and 15 are fragmentary perspective views of the metal strip of FIG. 11 with non-conductive coloring material selectively applied in various configurations.

Figure 16:
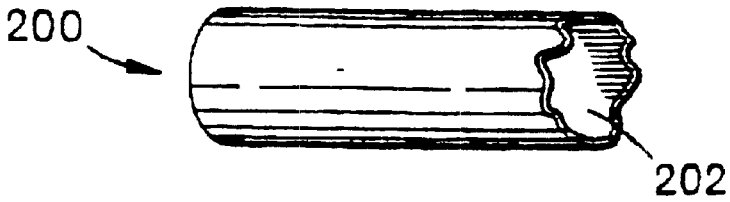

FIG. 16 is a fragmentary perspective view of a continuous cylinder, with a smooth outer wall, comprising the armored cable sheath.

Figure 17:
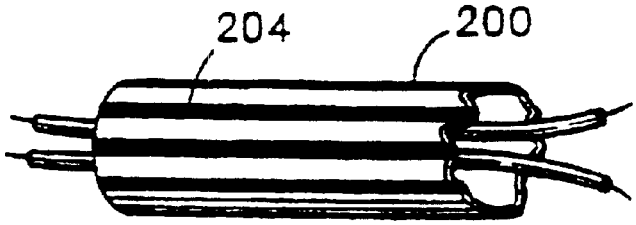
Figure 18:
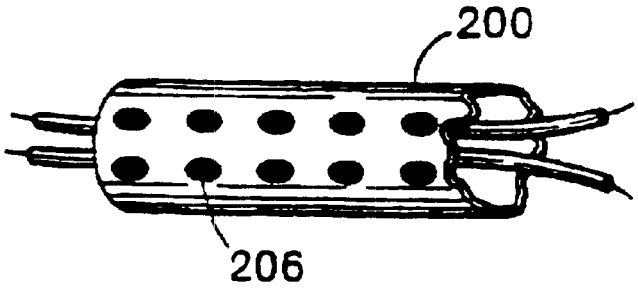

FIGS. 17 and 18 are fragmentary perspective views of the cylinder of FIG. 16 with a non-conductive coloring material selectively applied to the outer wall and insulated wires extending from the sheath.

Figure 19:
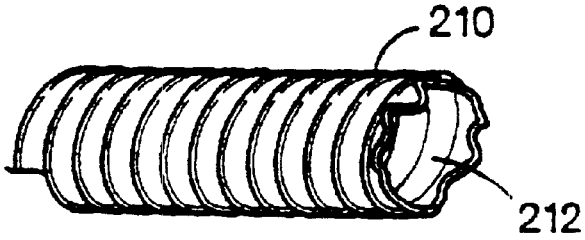

FIG. 19 is a fragmentary perspective view of a continuous cylinder, with an outer wall having helical corrugations, comprising the armored cable sheath.

Figure 20:
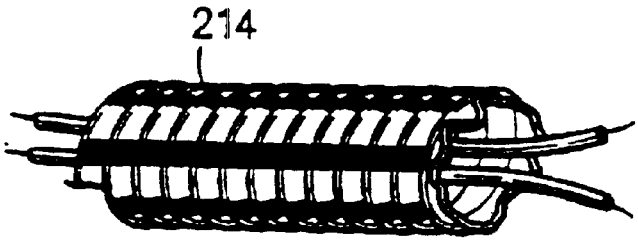
Figure 21:
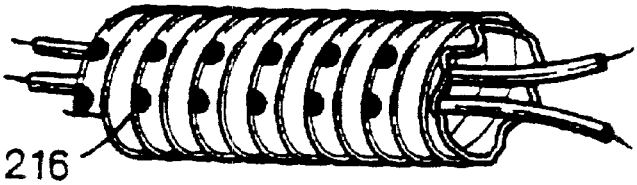

FIGS. 20 and 21 are fragmentary perspective views of the cylinder of FIG. 19 with a non-conductive coloring material applied to the outer wall and insulated wires extending from the sheath.

Figure 22:
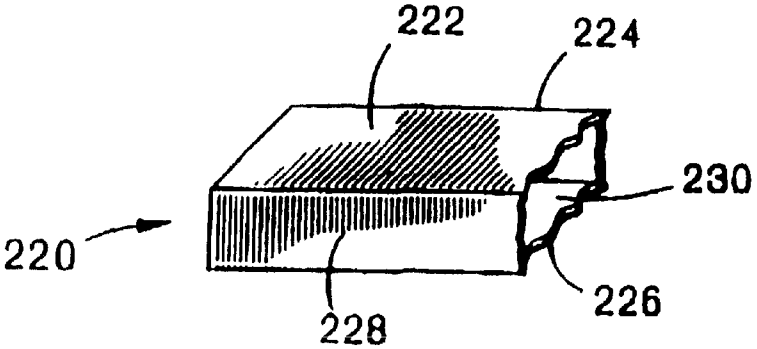

FIG. 22 is a fragmentary perspective view of a tube, having a generally rectangular transverse cross-sectional configuration and smooth outer walls, comprising the armored cable sheath.

Figure 23:
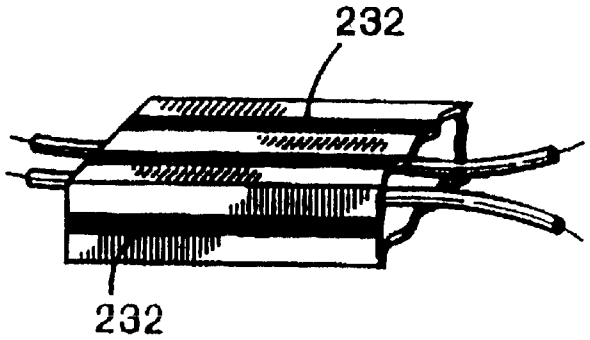

FIG. 23 is a fragmentary perspective view of the tube of FIG. 22 with a non-conductive coloring material selectively applied to the outer walls and insulated wires extending from the sheath.

Figure 24:
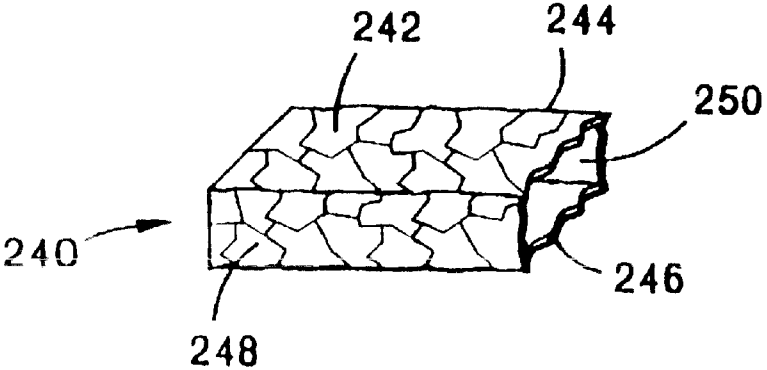

FIG. 24 a fragmentary perspective view of a tube, having a generally rectangular transverse cross-sectional configuration and corrugated outer walls, comprising the armored cable sheath.

Figure 25:
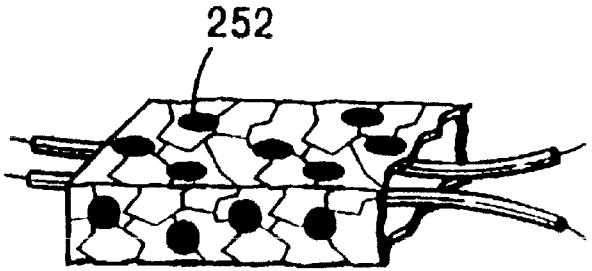

FIG. 25 is a fragmentary perspective view of the tube of FIG. 24 with a non-conductive coloring material applied to the outer walls and insulated wires extending from the sheath.

Figure 26:
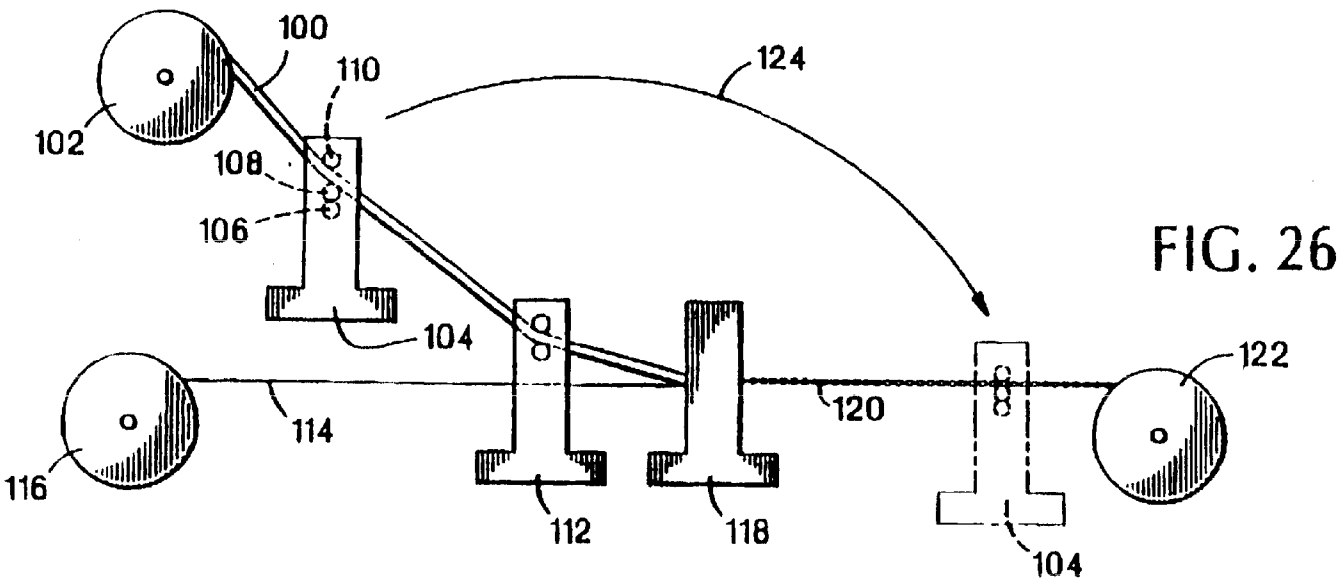
Figure 27:
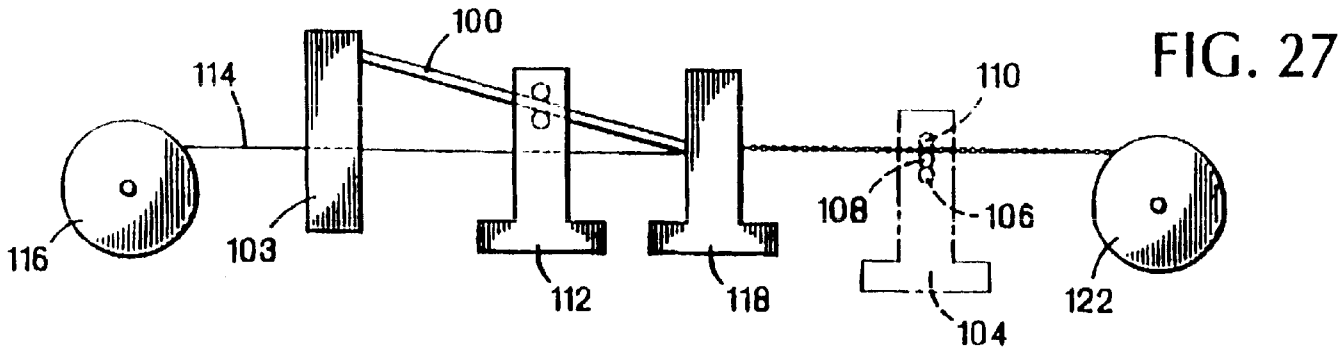

FIGS. 26 and 27 are each a schematic process diagram of a manufacturing process for making helically-wound color-coded armored cable.

Figure 28:
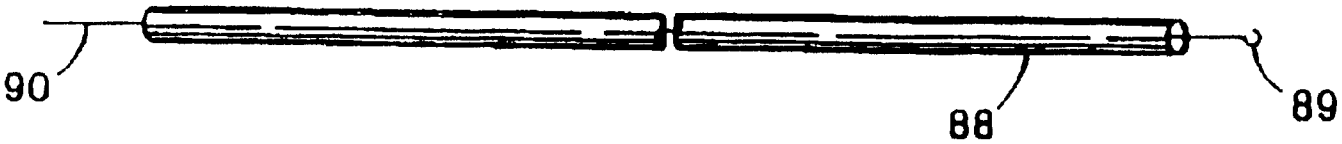
Figure 29:
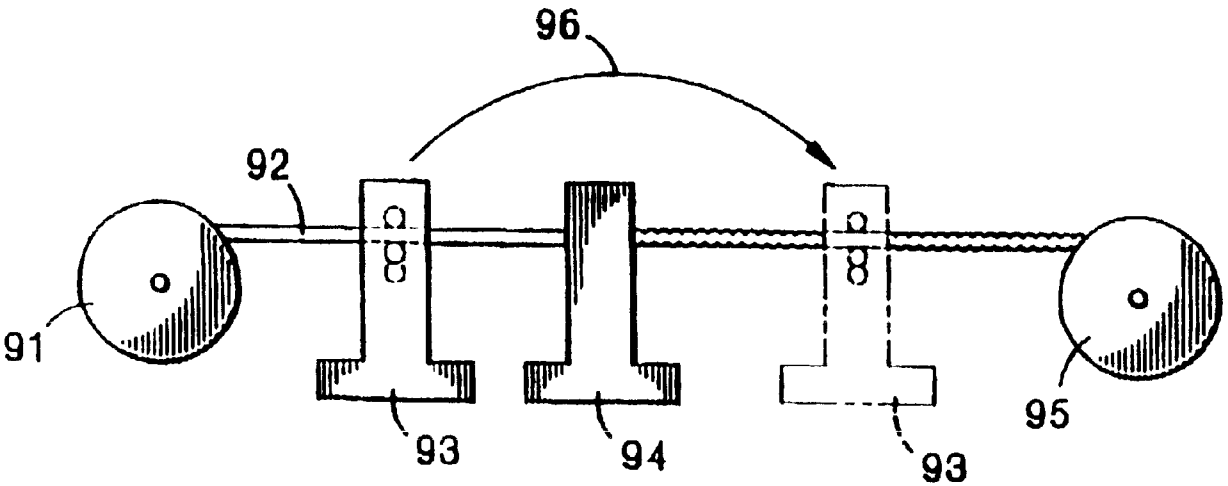

FIGS. 28 and 29 are schematic process diagrams of an off-line manufacturing process for color-coding armored cable made from continuous tubing.

Figure 30:
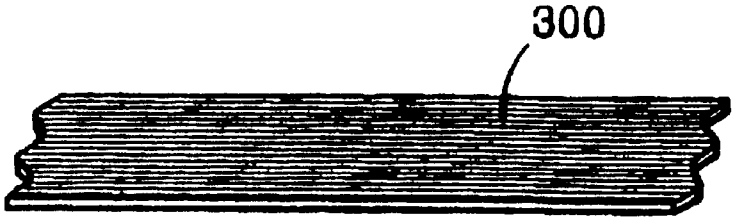

FIG. 30 is a fragmentary perspective view of the metal strip of FIG. 11 with a conductive coloring material applied to one tire side.

Figure 31:
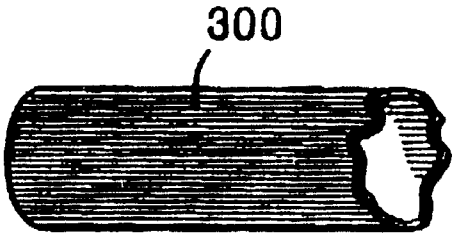

FIG. 31 is a fragmentary perspective view of the cylinder of FIG. 16 with a conductive coloring material applied to the entire outer wall, and insulated wires extending from the sheath.

Figure 32:
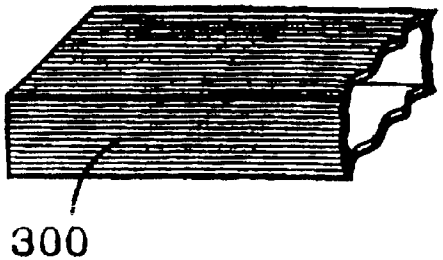

FIG. 32 is a fragmentary perspective view of the tube of FIG. 22 with a conductive coloring material applied to entirely cover the outer walls, and insulated wires extending from the sheath.

Figure 33:
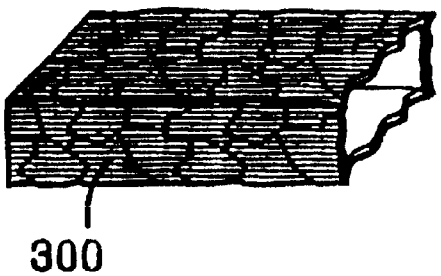

FIG. 33 is a fragmentary perspective view of the tube of FIG. 24 with a conductive coloring material applied to entirely cover the outer walls, and insulated wires extending from the sheath.

Figure 3:
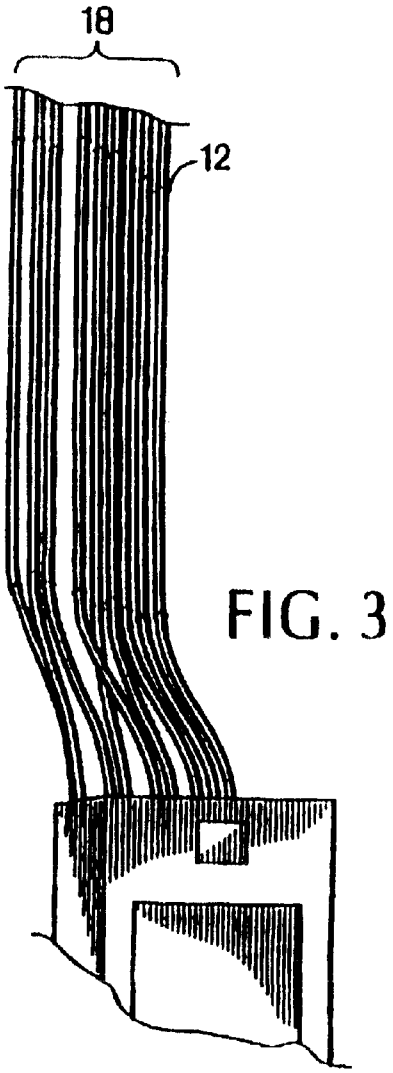
FIGS. 1 and 3 are perspective views of armored cables installed in a building and leading to various areas of the building to be terminated in distribution boxes serving various circuits.
Figure 2:
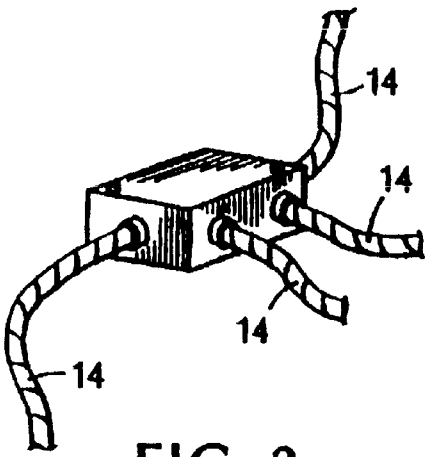
FIG. 2 is a perpective view of a junction box.
Figure 1:
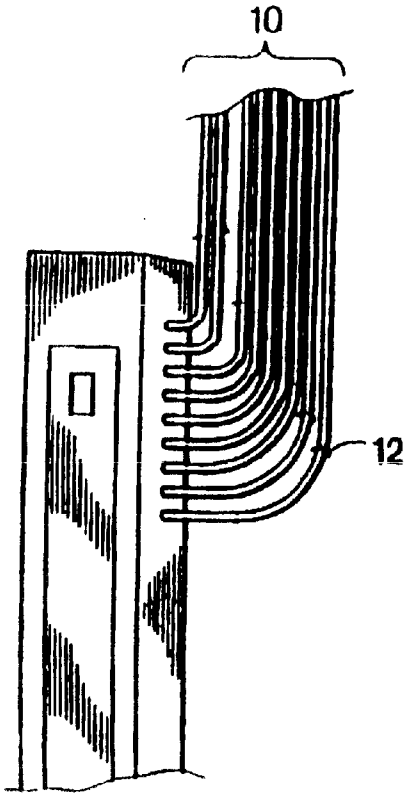

Referring to FIGS. 1, 2, and 3, the color-coded armored cable of the invention may be installed by routing it along and through the walls and studs of a building. (Although much of the description refers to color-coded cable, it should be understood that non-color patterns may also be used for coding the cable.) During installation, the color-coded armored cable is cut and bent to conform to the features of the building and secured in place with fasteners 12. A typical wiring job requires armored cable of various types, e.g., one application within the building may require armored cable enclosing relatively few conductors of relatively large gauge, and another application may require armored cable which houses a relatively large number of conductors of relatively small gauge. The particular application determines the kind of armored cable used. (Any application permitted under the applicable codes is possible, e.g., wiring for fire alarm systems, generators, motors, lighting, HVAC systems.) During installation, all armored cables associated with the same application or all armored cables of a given type are selected to have the same color and color pattern on their sheaths, and (in the case of a given application) are typically, but need not be, located near each other.

Figure 6:
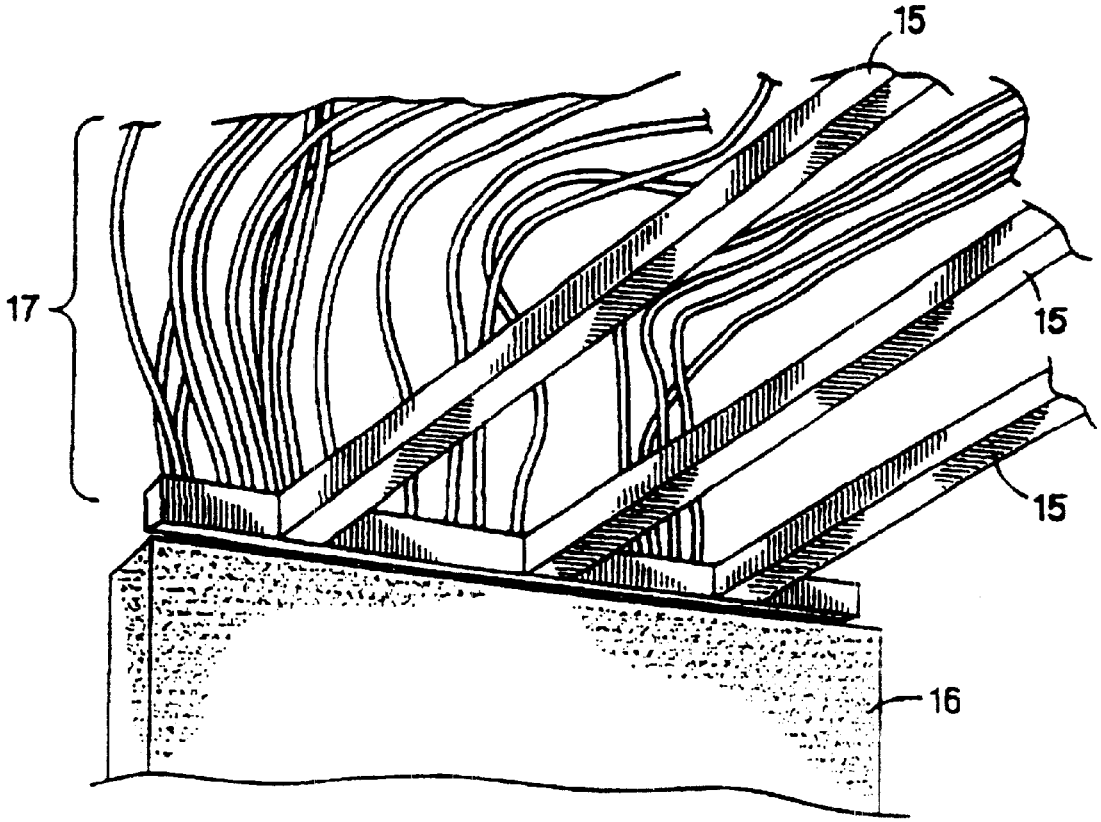
FIG. 6 is a perspective view of a maze of armored cables installed in the ceiling of a building.

One group of color-coded armored cables 10 may serve a fire alarm system, for example. Another group 14 may serve an HVAC system. Still another group 18 may serve lighting fixtures. All armored cables belonging to a particular group bear the same color or the same pattern of markings, for example, red for group 10, blue for group 14, and yellow for group 18. The different colors allow quick and easy visual identification of all cables for a particular application. This aids in inspecting and tracing the cables after installation, even though the routing of the cables may be disorganized. (Referring to FIG. 6, a typical wiring job utilizing armored cable may include a disorganized maze of armored cables 17 installed above ceiling beams 15 and behind a wall 16.)

Figure 4:
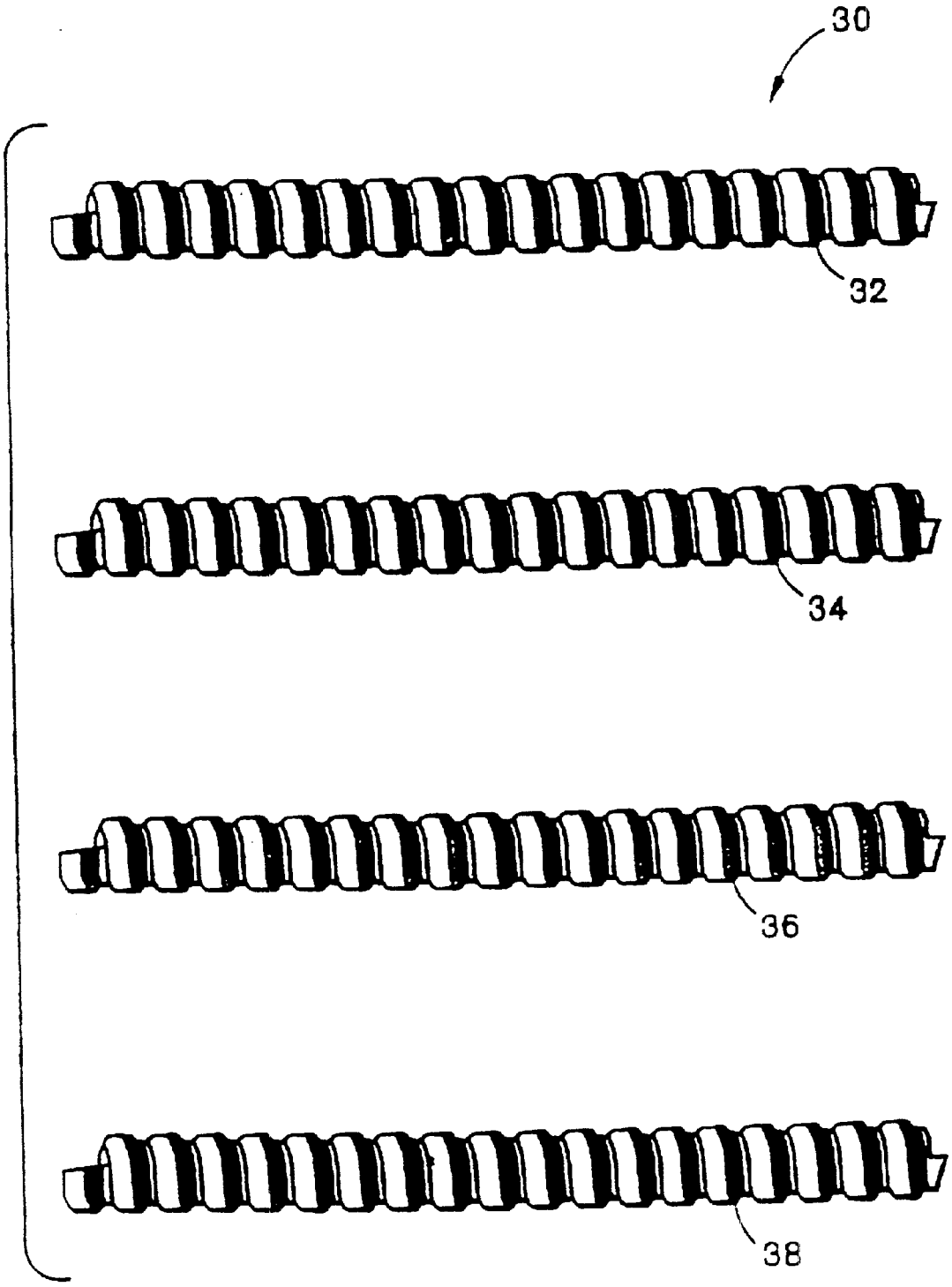
FIG. 4 is a colored drawing of a set of armored cables.

Referring to FIG. 4, a set of four armored cables 30 may include sheaths with blue markings 32, red markings 34, yellow markings 36, and orange markings 32, red markings 34, yellow markings 36, and orange markings 38 (other colors and patterns of markings could be used). On a typical wiring job the use of a set of color-coded armored cables saves time, improves safety, and reduces error.

The color markings also allow the armored cable to be inventoried and retrieved quickly and accurately. The color markings on the armored cable are easily seen from a distance. The color markings also may reduce the chance of a person cutting into either the wrong circuit or an energized circuit during modification or installation work.

Figure 5:
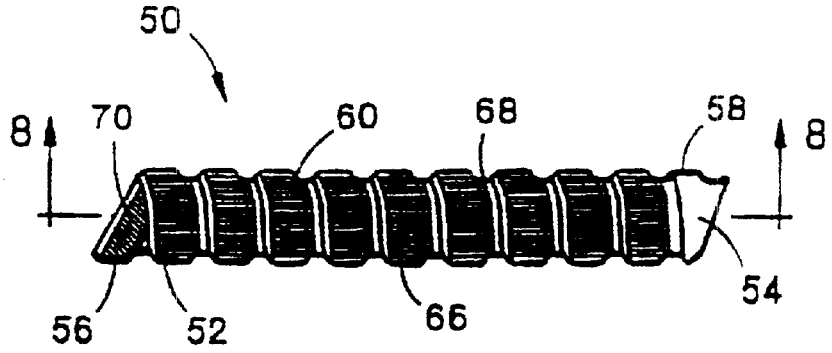
FIGS. 5 is a fragmentary plan view of a piece of an armored cable sheath showing a partial cross-section at each end.

Referring to FIG. 5, color-coded armored cable sheath 50 may be a helically-wound tubular structure having an outer surface 52 and an inner surface 54. (The armored cable sheath has been cut at 56, 58 to allow the inner surface 54 to be seen.) In some embodiments a non-conductive colored ink 60 colors selective portions of the outer surface 52.

Figure 7:
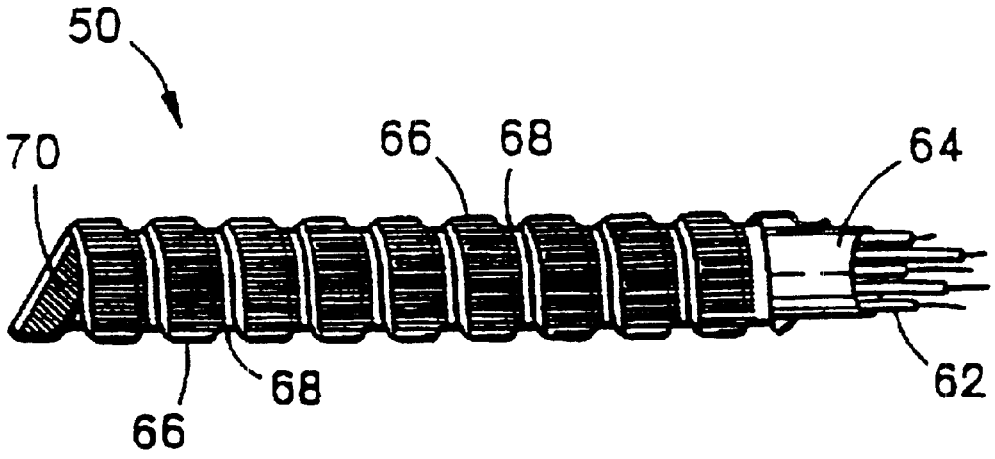
FIG. 7 is a fragmentary plan view of Type MC armored cable sheath, similar to FIG. 5, with insulated wires extending from the sheath.

Referring to FIG. 7, a section of Type MC armored cable has individually-insulated wires 62 extending through the internal passage of sheath 50. The group of wires 62 is also surrounded by a layer of insulation 64 (e.g., a wound strip of thin, protective paper or plastic) which also lies within the internal passage of sheath 50. The combination of the armored cable sheath 50 and the enclosed conductors is referred to as armored cable.

During manufacture of an armored cable sheath, a strip of metal first is formed to produce a contour that includes crowns 66 and troughs 68. The strip is then helically wound and interlocked to form a strong, bendable armored cable sheath.

Figure 8:
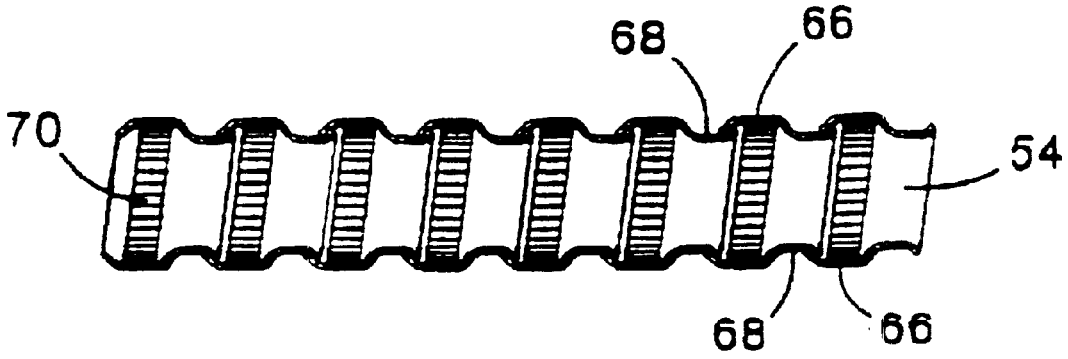
FIG. 8 is a view of the armored cable sheath in cross-section, taken along line 8—8 in FIG. 5.
Figure 9:
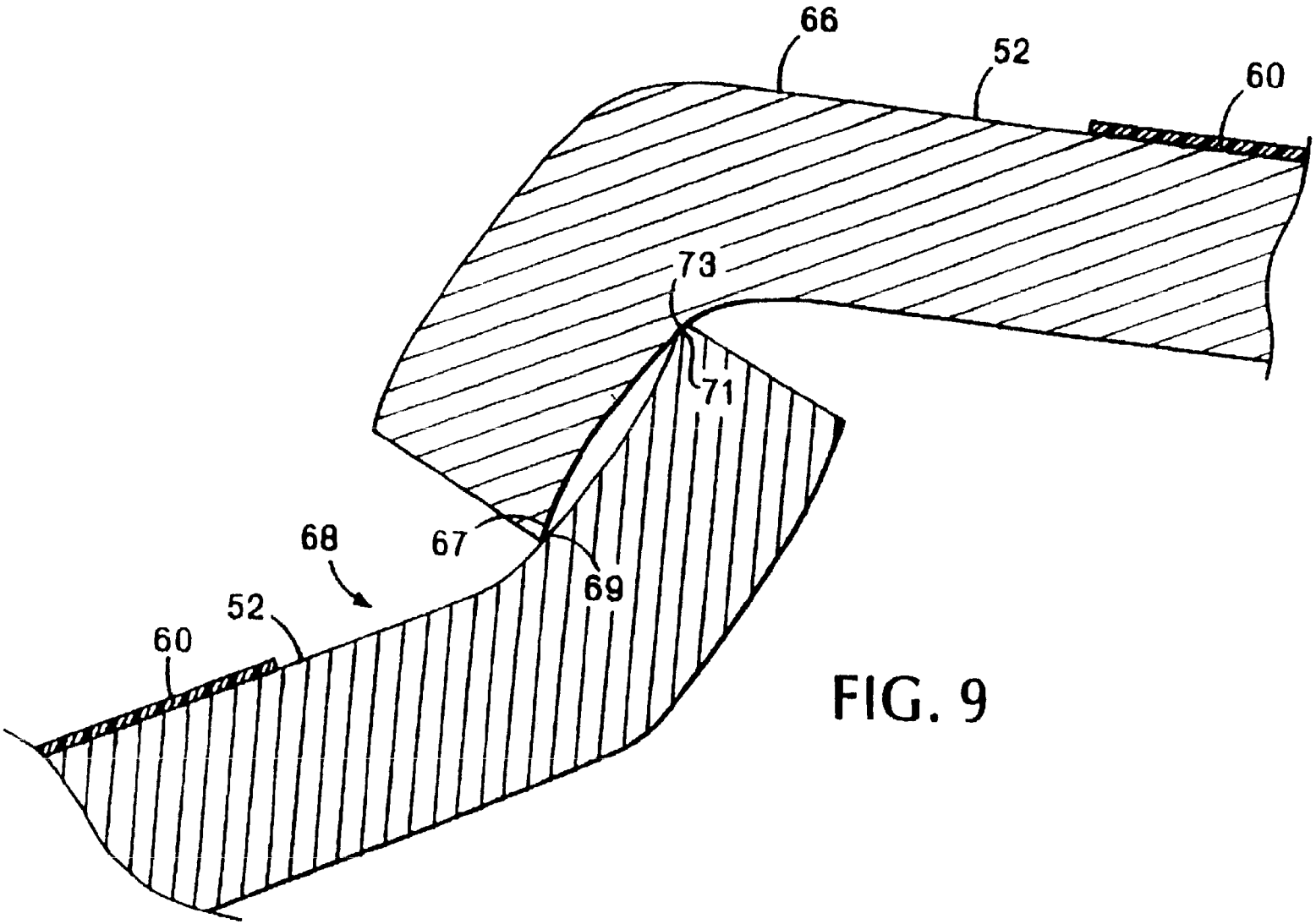
FIG. 9 is an enlarged sectional view of an interlocked connection between overlapping sections of an armored cable sheath.

Referring to FIGS. 8 and 9, when interlocked, the edge 67 of the strip which forms one turn makes sufficient electrical contact along its edge length with the outer surface 69 of the next winding of the sheath (and edge 71 makes sufficient contact with surface 73) to assure a conductive path along the length of the cable. The electrical contact between each turn of the strip and the adjacent turn provides a conductive path along the sheath from one end of the cable to the other. This conductive path supplements the long helical conductive path provided along the surface and body length of the metal strip, which also contributes to the conductivity along the length of the cable.

To ensure the integrity of this supplemental conductive path, when non-conductive colored ink 60 is used, it is selectively applied to the outer surface 52. Because the colored ink 60 is non-conductive, it is not applied to the edges of the strip which must interlock and make electrical contact with the next winding of the sheath. The ink is also not applied to portions of the cable sheathing (i.e., the crowns) which touch the connectors used to attach the cable to electrical panels or boxes. This assures the conductivity of the electrical path to ground throughout the circuit.

Referring again to FIG. 5, in some embodiments, the non-conductive colored ink 60 is selectively applied as a stripe to one side of the metal strip (the side corresponding to the outer surface of the sheath) before the metal strip is helically wound. The stripe of colored ink is narrower than the width of the metal strip to which it is applied. In some embodiments, the stripe of colored ink is not centered on the metal strip but instead is positioned closer to one edge of the metal strip than the other edge. (Approximately 2 mm of bare metal is maintained on one side of the stripe of colored ink, and about 3 mm of bare metal is maintained on the other side of the stripe, although the actual figures are at least partially dependent on the width of the metal strip being employed and the desired electrical conductivity.)

Figure 10:
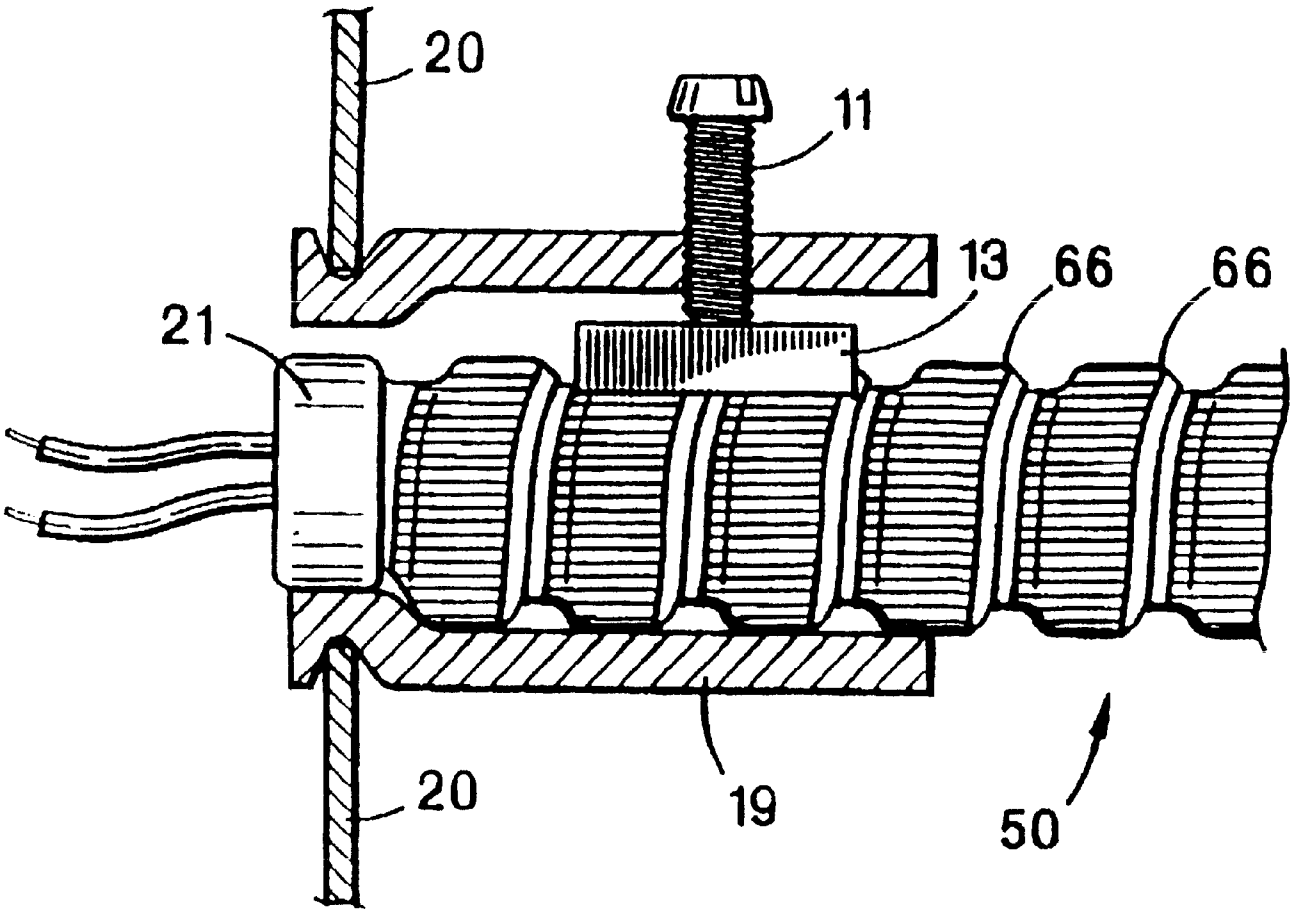
FIG. 10 is an enlarged, partially sectional view of an armored cable locked in position by a connector mounted in a terminal box

Referring to FIG. 10, when the inked metal strip is helically wound to form the sheath, the wider area of bare metal corresponds to the exposed (i.e., bare metal) crowns 66. The bare metal portion of the crowns 66 that results from the selective placement of the non-conductive colored ink assures good electrical contact with a connector 19 used to attach the end of the cable to a metal terminal box In some embodiments, connector 19 includes a metal lock screw 11 attached to a metal lock plate 13 which bears against the armored cable 50 and locks it securely in place when screw 11 is tightened. The connector 19 thus makes electrical and mechanical contact with the armored cable 50 via the metal plate 13, the screw 11, and the wall of the connector 19. (The metal terminal box 20 is in electrical contact with the connector 19, and that the end of the armored cable 50 is capped with a protective bushing 21.)

Figure 12:
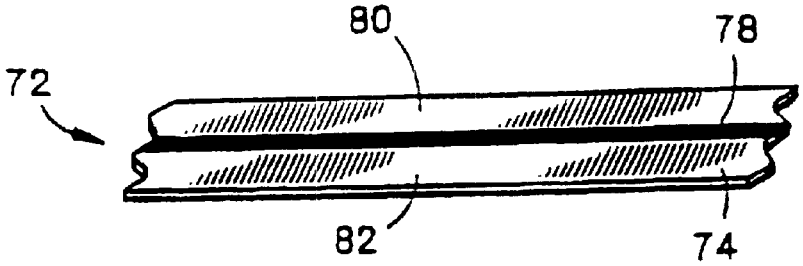
FIG. 12 is a fragmentary perspective view of the metal strip of FIG. 11 with a non-conductive coloring material selectively applied to one side.

Referring to FIG. 11, the metal (e.g., aluminum or steel) strip has two opposite sides 74, 76, and in some embodiments is about 1 cm wide and about 0.5 Run thick. Referring to FIG. 12, stripe 78 in the case of non-conductive colored ink is selectively applied to one side 74 of the metal strip 72. Continuous strips of bare metal 80, 82 extend lengthwise on either side of the stripe of colored ink 78. In some embodiments, one continuous strip (e.g., strip 80) is about 3 mm wide, and the other continuous strip (e.g., strip 82) is about 2 mm wide.

Referring to FIG. 26, during manufacture, metal strip 100 is fed from a supply spool 102 to an inking machine 104 which selectively applies non-conductive colored ink to one side (the top side in the figure) of the metal strip 100. The inking machine 104 includes an inking roll 106 which supplies ink to an etched roll 108 contacting one side of the metal strip. The etched roll 108 applies the ink to the metal strip as a third roll 110 holds the metal strip against the etched roll 108. The metal strip exiting the inking machine 104 enters a profile machine 112 which forms the inked metal strip into an "S" shape (see the cross-section in FIGS. 5 and 8). Next, the S-shaped, inked metal strip is helically wrapped around one or more conductors 114, providing from a supply spool 116, by a convoluting machine 118. The convoluting machine 118 forms the interlocking edges which, among other things, provide the supplemental electrical continuity (from one end of the sheath to the other) described previously. (The convoluting machine 118 also forms slight indentations 70, as seen in FIGS. 5, 7, and 8, on the inner surface 54 of the sheath.) The helically-wound, color-coded armored cable 120 exits the convoluting machine 118 as the finished product, as is collected on take-up spool 122.

Other embodiments are within the following claims. For example, the stripe of non-conductive colored ink (FIGS. 12) may be centered on the metal strip instead of being positioned closer to one edge of the metal strip than to the other edge. Also, a metal strip having a different width and/or thickness from the strip 72 of FIG. 11 may be used.

The non-conductive colored ink may be applied in a wide variety of configurations other than a stripe, a few examples being shown as patterns of squares 84 (FIG. 13), dots 86 (FIG. 14), or Xs 87 (FIG. 15). It is also possible to apply varying or combined patterns to the exterior of the armored cable sheath, e.g., a repetitive sequence including a dot followed by a square. One strategy for applying the patterns is to assure that regions of bare metal 80, 82 appear frequently along the length of the strip so that virtually any contacts along the length of the sheath will be electrically conductive contacts, and so that the crowns 66 on the sheath have bare metal portions for making adequate electrical contact with the metal connector 19 (FIG. 10).

Referring to FIG. 16, the convoluted metal strip could be replaced by continuous metal tube 200 having a relatively smooth outer wall (of appropriate thickness to permit bending) and an internal passage 202. The colored markings are applied to the exterior surface of the tube 200. The pattern may be, for example, continuous strips 204, spaced around the circumference of tube 200 (FIG. 17) or rows of dots 206 (FIG. 18). The main requirement is that bare metal be exposed as necessary to assure that a metal connector attached anywhere along the length of the cable will make electrical contact with the smooth outer wall of tube 200.

Referring to FIG. 19, alternatively the armored cable sheath may be a continuous solid metal tube 210 having an outer wall with helical corrugations and an internal passage 212. The corrugations allow the tube 210 to be bent more easily, at greater angles, and into smaller arcs than an uncorrugated tube. Two possible patterns include stripes (FIG. 20) and dots (FIG. 21).

Referring to FIG. 22, the continuous metal tube 220 could have a generally rectangular transverse cross-sectional configuration and smooth outer walls 222, 224, 226, 228. Referring to FIG. 23, as one example, the ink may be applied in continuous stripes 232 or other configurations suggested in the other figures.

Referring to FIG. 24, the rectangular cross-section tube could have corrugated outer walls 242, 244, 246, 248. Referring to FIG. 25, the ink may be applied, as one example, in a pattern of dots 252, or in the manner shown in other figures.

Regardless of the pattern, it is useful to apply enough colored ink to the sheath to make the color of the armored cable readily visible from a distance.

In other embodiments the exterior of the cable may be coated with a wide variety of other nonconductive materials other than ink, for example, dye or paint or others Ultraviolet curing flexographic inks (available, e.g., from QureTech, Inc., Seabrook, N.H.) could be used. Also, if aluminum is used, the aluminum may be anodized to form non-conductive color as part of the metal itself.

Conductive materials such as conductive ink, dye, or paint or other conductive materials may also be used in place of non-conductive materials. The conductive materials may be applied in the same manner described for the nonconductive materials. When conductive coatings are used for color coding, the patterns of coating need not leave as much (or any) bare metal on the exterior of the armored cable sheath. For example, referring to FIGS. 30, 31, 32, and 33, a conductive coating 300 may cover the entire exterior of a sheath of an armored cable. Also, multiple colors could be used on a cable in a single pattern or a combination of patterns.

Coding of different armored cables could be done by differentiating the patterns of markings rather than the colors of the markings on the outer surface of the sheath. For example, a red striped pattern could be used for one application and a red dotted pattern for another application. The markings need not have any color but could be done in the form of patterns. Whatever visual indications are used, they should be easily distinguishable when viewed from a distance and should appear continuously or at frequent intervals along the length of the cable so that even a short length of cable will be easily identified.

Referring to FIGS. 28 and 29, in forming the color-coded armored cable from a continuous tube 88, the continuous tube SS is laid flat and a hook 89 with a long handle 90 is inserted through the internal passage of the tube. One end of each wire that is to be enclosed by the tube to form the finished armored cable is attached to the hook 89, and the wires are drawn through the tube 88 by use of the handle 90. The tube 88 may be, for example, a smooth-walled cylinder (FIG. 16), a corrugated-wall cylinder (FIG. 19), a smooth-walled tube having a generally rectangular transverse cross-section (FIG. 22), or corrugated-wall tube having a generally rectangular transverse cross-section (FIG. 24).

With the wires extending through the length of the tube 88, the armored cable 92 (i.e., the tube 88 with the wires inside) is, e.g., rolled onto a supply spool 91. To color and form the armored cable 92, the cable is fed off the supply spool 91, into an inking machine 93 (similar to the inking machine of FIG. 26), and through a convoluting machine 94. The convoluting machine 94 may form, e.g., convolutions, rectangular shapes, or corrugations in the exterior of the color-coded armored cable. The color-coded, convoluted (or shaped) armored cable exits the convoluting machine and is collected on a take-up spool 95.

The inking machine 93 may be moved (as indicated by arrow 96) to the position indicated in phantom in FIG. 29. In its alternative position, the inking machine 93 marks the armored cable with colored ink (or dye or paint, as described previously) after it exits the convoluting machine 94 but before it is collected on the take-up spool 95.

The continuous tube 88, through which the wires are pulled with hook 89 and handle 90, could already have color markings (e.g., in the form of stripes or dots) on its exterior prior to processing to form the corrugated armored cable. In this case, the inking machine 93 would not be used at all in the process of FIG. 29.

If color-coded armored cable having a smooth wall is required, the convoluting machine 94 would be omitted and only the inking machine 93 would be used in the manufacturing process of FIG. 28.

Referring to FIG. 26, the marking of the helically-wound color-coded armored cable may be done after the sheath is formed by moving (as indicated by arrow 124) the inking machine 104 to the position indicated in phantom.

Another process of forming the helically-wound color-coded armored cable is to supply metal strip already having a stripe (or some other pattern) of colored ink (or dye or paint) on one side to the profile machine 112. This alternative process would not require an inking machine 104 to be included in the process of profiling and convoluting the metal strip around the conductor(s) 114 to form the helically-wound color-coded armored cable.

Referring to FIG. 27, as an alternative to FIGS. 26, during manufacture, one or more conductors 114 may be fed from the supply spool 116 through a rotating machine 103 which rotates the supply of metal strip 100. The metal strip 100 enters the profile machine 112, which forms the metal strip into an "S" shape (see the cross-section in FIGS. 5 and 8), and then passes into the convoluting machine 118 which helically wraps the S-shaped metal strip around the conductor(s) 114 to form the armored cable. The armored cable enters the inking machine 104 (indicated in phantom) which selectively applies colored ink as described previously. The helically-wound, color-coded armored cable 120 exits the inking machine 104 as the finished product, and is collected on take-up spool 122. If pre-marked metal strip is provided by the rotating machine 103, the inking machine 104 (indicated in phantom) may be eliminated from the manufacture process of FIGS. 27.

Referring to FIGS. 26, 27, and 29, the inking machine could use "inkier" or paint sprayers to apply the colored material (e.g., ink, dye, or paint, whether conductive or non-conductive) to the metal strip instead of using the inking roll and etched roll. Also, a brush-type application instrument could be used in place of the rollers or sprayers. A constant supply of ink, dye, or paint would be supplied to the brush-type applicator during the application process. Dip pans or wipes could also be used.

What is claimed is:

1. An armored cable sheath comprising a conductive tubular structure having an internal passage, an outer surface, a first end, and a second end, the internal passage being sized and configured to enclose one or more conductors, said tubular structure being made of a material having a first visual appearance, and a pattern of visible indicia, of different visual appearance from said first visual appearance, applied on said outer surface, said pattern being repeated along the length of said sheath.

2. Apparatus comprising:

a tubular conductive sheath having first and second ends and inner and outer surfaces, the inner surface of the sheath defining an internal passage sized and configured to enclose one or more conductors;

visible indicia displayed on the outer surface of the sheath, the visible indicia spanning between the first and second ends of the sheath and providing the outer surface of the sheath with a visual appearance different from a visual appearance of the outer surface of the sheath without the visible indicia.

3. The apparatus of claim 2 wherein the visible indicia comprise a pattern.

4. The apparatus of claim 3 wherein the pattern repeats along the length of the sheath.

5. The apparatus of claim 2 wherein the visible indicia comprise color.

6. The apparatus of claim 5 wherein the visible indicia comprise red coloring.

7. The apparatus of claim 5 wherein the visible indicia comprise anodized metal.

8. The apparatus of claim 5 wherein the visible indicia comprise ink, dye, or paint.

9. The apparatus of claim 8 wherein the ink, dye, or paint is substantially conductive.

10. The apparatus of claim 8 wherein the ink, dye, or paint is substantially conductive.

11. The apparatus of claim 2 wherein the visible indicia are continuous between the first and second ends of the sheath.

12. The apparatus of claim 11 wherein the visible indicia comprise a stripe extending from the first end to the second end of the sheath.

13. The apparatus of claim 12 wherein the stripe traverses a helical path around the outer surface of the sheath.

14. The apparatus of claim 12 wherein the stripe substantially covers the outer surface of the sheath.

15. The apparatus of claim 14 wherein the stripe is substantially conductive.

16. The apparatus of claim 2 wherein the visible indicia are spaced apart along the length of the sheath between the first and second ends of the sheath such that regions disposed between adjacent indicia exhibit the visual appearance of the outer surface of the sheath.

17. The apparatus of claim 16 wherein the visible indicia comprise a series of spots.

18. The apparatus of claim 2 wherein the visible indicia leave at least a portion of the outer surface of the sheath exposed.

19. The apparatus of claim 18 wherein the visible indicia leave at least a portion of the first and second ends of the outer surface exposed.

20. The apparatus of claim 2 wherein the conductive sheath comprises a helically wound conductive strip forming a tubular structure with alternating crowns and valleys along the length of the sheath.

21. The apparatus of claim 20 wherein the visible indicia leave at least a portion of the outer surface of the crowns exposed.

22. The apparatus of claim 20 wherein the visible indicia leave at least a portion of the outer surface exposed where edges of the strip along the crowns contact a surface of the strip at the valleys.

23. The apparatus of claim 2 wherein the conductive sheath comprises a continuous metal tubular structure.

24. The apparatus of claim 23 wherein the outer surface of the continuous metal tubular structure is provided with alternating crowns and valleys along the length of the continuous metal tubular structure.

25. The apparatus of claim 24 wherein the crowns and valleys form a helical configuration on the outer surface of the continuous metal tubular structure.

26. The apparatus of claim 2 further comprising the one or more conductors disposed within the internal passage of the conductive sheath.

27. The apparatus of claim 26 further comprising a layer of insulation disposed between the one or more conductors and the inner wall of the sheath.

28. The apparatus of claim 27 wherein the insulation comprises paper.

29. The apparatus of claim 27 wherein the insulation comprises plastic.

30. Apparatus comprising:

a tubular conductive sheath having first and second ends and inner and outer surfaces, the inner surface of the sheath defining an internal passage sized and configured to enclose one or more conductors;

a substantially conductive coating disposed on the outer surface of the sheath, the coating having a visual appearance different from a visual appearance of the outer surface of the sheath.

31. The apparatus of claim 30 wherein the coating comprises ink, dye, or paint.

32. The apparatus of claim 30 wherein the coating comprises a pattern.

33. The apparatus of claim 32 wherein the pattern repeats along the length of the sheath.

34. The apparatus of claim 33 wherein the pattern comprises a stripe extending along the length of the sheath.

*35. Apparatus comprising:*

*a tubular conductive sheath having first and second ends and inner and outer surfaces, the inner surface of the sheath defining an internal passage sized and configured to enclose one or more conductors; and*

*visible indicia that permit electrical conductivity, are displayed along at least a portion of the sheath between the first and second ends of the sheath, and impart to the outer surface of the sheath a visual appearance different from a visual appearance of the outer surface of the sheath without the visible indicia.*

*36. The apparatus of claim 35 in which the visible indicia comprise a substantially non-conductive material arranged to permit electrical conductivity.*

*37. The apparatus of claim 35 in which the visible indicia comprise a removable coating of a substantially non-conductive material.*

*38. The apparatus of claim 37 in which the removable coating comprises paint.*

*39. The apparatus of claim 35 in which the visible indicia are arranged to expose at least a portion of the outer surface of the conductive sheath as necessary to assure that a connector attached to the sheath will make electrical contact with the outer surface of the sheath.*

*40. The apparatus of claim 39 in which the visible indicia are arranged to expose at least a portion of the outer surface of the sheath by leaving uncoated areas on the outer surface.*

*41. The apparatus of claim 35 in which the sheath is helically wound.*

*42. The apparatus of claim 41 in which the visible indicia comprise a removable coating of a substantially non-conductive material arranged to expose at least a portion of the outer surface of the conductive sheath as necessary to assure that a connector attached to the sheath will make electrical contact with the outer surface of the sheath.*

*43. The apparatus of claim 41 in which the visible indicia are arranged to expose at least a portion of the outer surface of the sheath by leaving uncoated areas on the outer surface.*

*44. The apparatus of claim 41 in which the visible indicia permit electrical conductivity between successive windings of the sheath.*

*45. The apparatus of claim 35 in which the conductive sheath comprises a continuous metal tubular structure.*

*46. The apparatus of claim 45 in which the outer surface of the continuous metal tubular structure is provided with alternating crowns and valleys along the length of the continuous metal tubular structure.*

*47. The apparatus of claim 46 in which the crowns and valleys form a helical configuration on the outer surface of the continuous metal tubular structure.*

*48. The apparatus of claim 45 in which the outer surface of the continuous metal tubular structure is smooth along the length of the continuous metal tubular structure.*

*49. A method comprising:*

*providing a tubular conductive sheath having first and second ends and inner and outer surfaces, the inner surface of the sheath defining an internal passage sized and configured to enclose one or more conductors, the*

*sheath bearing visible indicia that permit electrical conductivity, are displayed along at least a portion of the outer surface of the sheath between the first and second ends of the sheath, and impart to the outer surface of the sheath a visual appearance different from a visual appearance of the outer surface of the sheath without the visible indicia, and*

*attaching a connector to the sheath in such a manner that the connector makes electrical contact with the outer surface of the sheath.*

*50. The method of claim 49 in which the visible indicia comprise a substantially non-conductive coating and the connector makes electrical contact with the outer surface notwithstanding the coating.*

*51. The method of claim 50 in which the connector makes electrical contact with the outer surface at a location that is not coated.*

* * * * *